Jan. 12, 1954   G. I. COCKERILL ET AL   2,665,575
DRIVE MECHANISM FOR WASHING MACHINES AND THE LIKE
Filed Dec. 8, 1948   4 Sheets-Sheet 1

INVENTORS
GERALD I. COCKERILL
WILLIAM F. SINDELAR
BY
ATTORNEY

INVENTOR.
GERALD I. COCKERILL
WILLIAM F. SINDELAR
BY
ATTORNEY

Jan. 12, 1954    G. I. COCKERILL ET AL    2,665,575
DRIVE MECHANISM FOR WASHING MACHINES AND THE LIKE
Filed Dec. 8, 1948    4 Sheets-Sheet 3

INVENTOR.
GERALD I. COCKERILL
WILLIAM F. SINDELAR
BY
W. G. Sullivan
ATTORNEY

Jan. 12, 1954 G. I. COCKERILL ET AL 2,665,575
DRIVE MECHANISM FOR WASHING MACHINES AND THE LIKE
Filed Dec. 8, 1948 4 Sheets-Sheet 4

INVENTORS
GERALD I. COCKERILL
WILLIAM F. SINDELAR
BY *W. H. Sullivan*
ATTORNEY

Patented Jan. 12, 1954

2,665,575

UNITED STATES PATENT OFFICE 2,665,575

DRIVE MECHANISM FOR WASHING MACHINES AND THE LIKE

Gerald I. Cockerill, Cleveland Heights, and William F. Sindelar, Cleveland, Ohio, assignors to The Apex Electrical Manufacturing Company, Cleveland, Ohio, a corporation of Ohio Application December 8, 1948, Serial No. 64,108

8 Claims. (Cl. 68—23)

1

This invention relates to washing machines of the spin-drier type, and more particularly to an improved drive mechanism for washing machines of this type.

The present invention is particularly adaptable to a washing machine of the spin-drier type embodying two coaxial shafts and wherein it is desired during operation of the machine to continuously drive one of said shafts and intermittently drive the other shaft or to alternately drive both said shafts. Further, the invention provides a relatively simple and inexpensive means of coupling coaxial shafts to a power source without the use of gearing and its attendant disadvantages such as periodic lubrication, noise, precision machining and the like.

According to one embodiment of the invention, a drive pulley is fixed to one shaft whereby this shaft may be continuously driven during operation of the machine and a combined clutch and brake member is fixed to the other shaft. The clutch and brake member is movable axially of the shafts, preferably by fluid pressure, whereby in one position the member will couple its associated shaft with the drive pulley so that both shafts may be concurrently driven and in another position the member will engage a non-rotatable braking surface whereby the shaft associated with the member will be held against rotation while the other shaft is driven.

In another embodiment of the invention the drive pulley is freely rotatable relative to both shafts with one face of the pulley being adapted to engage a clutch and brake member associated with one shaft and the other face of the pulley being adapted to engage a second clutch and brake member associated with the other shaft. The clutch and brake members may be actuated, preferably by fluid pressure, whereby when one member engages the drive pulley to rotate its associated shaft, the other member will engage a braking surface to hold its associated shaft against rotation. In this modification the shafts may be intermittently and alternately driven.

It is a primary object of the invention to provide a relatively simple drive mechanism for washing machines of the spin-drier type.

Another object of the invention is to provide an improved drive mechanism for spin-drier type washing machines employing coaxial drive shafts.

Another object of the invention is to provide an improved drive mechanism for spin-drier type washing machines employing coaxial drive shafts including clutch and brake means operable by fluid pressure.

2

Another object of the invention is to provide a drive mechanism for spin-drier type washing machines which can be initially embodied in the machine as a unit and which can be removed as a unit and replaced by a similar unit in servicing the machine.

Another object of the invention is to provide a drive mechanism of the above type which is relatively simple in construction, which is relatively quiet in operation, which does not require any gears, which can be easily serviced, which does not require periodic lubrication, and which does not require periodic manual adjustment.

Other objects of the invention and the invention itself will become increasingly apparent from a consideration of the following description and drawings wherein.

Figure 1:
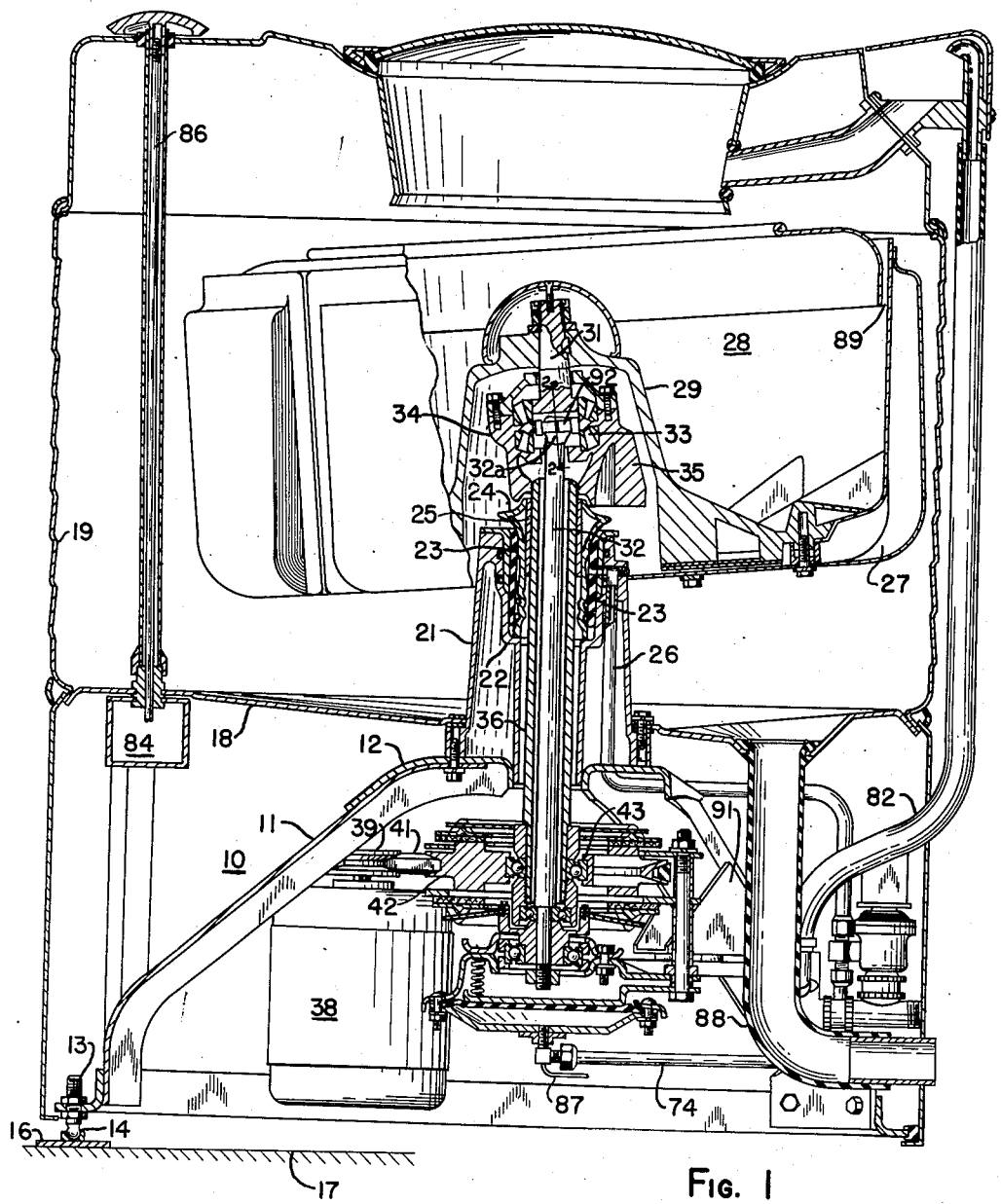
Figure 1 is a vertical, medial sectional view of a spin-drier type washing machine embodying our improved drive mechanism.

Referring now to the drawings and particularly Fig. 1, we have illustrated our improved drive mechanism in association with a washing machine of the general type more fully described in a copending application of Gerald I. Cockerill and Ralph L. Archbold, Serial No. 704,482, filed October 19, 1946, patented November 16, 1951, Number 2,574,170. The machine comprises a frame generally indicated at 10, preferably formed of four equally spaced channel shaped legs 11 secured to a top plate 12. Each leg may be individually adjusted through a stud 13 having a ball shaped foot 14 received in a cup shaped member 16 which is bonded to a supporting surface 17. Adjustment of the studs 13 and securing the same in adjusted position through lock nuts will permit leveling of the machine on an uneven supporting surface such as 17. Supported from the frame top plate 12 is the base 18 of a preferably square tub 19, the base 18 having a central aperture through which projects a pedestal 21 also supported by frame top plate 12. The pedestal top portion is of re-entrant cup form, as indicated at 22, within which a tubular member 23 formed of rubber or the like material is fixed. Cooperating with tubular member 23 and normally forming a seal therewith is a generally cylindrical metal member 24 whereby a valve arrangement is effected adapted to permit water supplied from a conduit 26 to be directed to pockets 27 disposed on the outer side wall of a clothes container or basket 28. As more fully described in the aforesaid copending application, when the container 28 is spinning with an out-of-balance load an opening will occur between members 23 and 24 permitting water under pressure to be directed to passages in the container base and subsequently to one or more pockets 27 opposite the zone of unbalance. The particular type of balancing means for the clothes container constitutes no essential part of the present invention and the drive mechanism may be employed without any balancing means, although in this instance the member 24 has a bearing 25 fixed thereto and serves the dual function of a valve member and an upper bearing for a tubular shaft.

The container 28 has a central re-entrant dome shaped portion 29 to which the upper end of a stub shaft 31 is secured. The lower end of shaft 31 is connected by a universal joint to a drive shaft 32, the universal joint including a double roller bearing 33 having its outer race seated in a housing 34 whereby the stub shaft 31 will be inclined at a slight angle, such as four degrees, from the vertical and if housing 34 is held against rotation and drive shaft 32 is rotated, the stub shaft and container will rotate about a fixed axis inclined at such angle from the vertical.

Surrounding shaft 32 and slightly spaced therefrom is a tubular shaft 36 which at its upper end engages the bearing 25 fixed to member 24 and above this bearing housing 34 is fixed to shaft 36. It will now be apparent that if shaft 36 is braked against rotation that housing 34 will be held against rotation, and if shaft 32 is rotated, that container 28 will spin about an inclined fixed axis as previously explained. Also, it will be apparent that if shaft 32 and resultantly the container 28 is held against rotation and the housing 34 is rotated by shaft 36, that a wobbling action will be imparted to the container. In other words, the axis of stub shaft 31 will be constrained to move in a conical path about the focal point of the universal joint as an apex and as more fully described in the aforesaid copending application, a washing action is thereby imparted to articles disposed in the container.

The manner of driving and braking the shafts 32 and 36 will now be explained. An electric motor 38 provided with a pulley 39 drives a V belt 41 which engages a driven pulley 42. Pulley 42 is freely rotatable relative to tubular shaft 36 through the provision of a lubricant sealed ball bearing 43, the inner race of the bearing being fixed to shaft 36 and the outer race being fixed to pulley 42. Shaft 36 is provided with an annular shoulder against which a collar 44 abuts, the collar having a down-turned flange which bears against a member 46 having a plurality of spring arms, preferably six, and which is keyed or otherwise secured to shaft 36 by a hub portion 47. The outer ends of the arms of member 46 seat within spaced recesses formed on the top surface of an annular clutch element 48. Element 48 has a ridge, generally triangular in cross section, formed on its top surface and its lower surface has suitable clutch facing material bonded thereto. Hub 47 engages the top surface of the inner race of bearing 43 and bearing 43 is held in axial position relative to tubular shaft 36 by a spacing washer 49 and a sleeve 51 threaded to the lower end of shaft 36. Sleeve 51 forms a housing for a lubricant sealed ball bearing 52, the inner race of the bearing engaging inner shaft 32. The lower surface of the inner race of ball bearing 52 seats against a member 53 keyed or otherwise secured to shaft 32 and which is locked against axial movement relative to said shaft by a washer 54 and nut 56 threaded to the lower end of the shaft.

A second clutch element 48 is supported by a member 57 having a plurality of spring arms, preferably six, with the radially inner portion of the member being secured to member 53 by a washer and a plurality of bolts 58. Member 53 is provided with an annular shoulder which abuts the top surface of the inner race of a lubricant sealed ball bearing 59, the lower surface of the bearing inner race abutting washer 54. The outer race of bearing 59 is gripped between circular blocks 63, preferably formed of lead, the blocks being housed within parts of a cross-member generally indicated at 61. The cross-member comprises oppositely extending channel form arms which are bolted or otherwise rigidly secured to the frame legs 11, the central portion of the cross-member having an annular pocket therein as indicated at 62 for receiving the lower block 63. The upper block is retained by an annular plate 64 forming part of the cross-member. The cross-member is provided with three spaced perforated lugs through which extend bolts 66, each bolt at its lower end being encircled by a step-form tube 67 which engages arms of a plate 68, the plate being held against a shoulder of the tube by a nut 69. Plate 68 abuts the top surface of a diaphragm 71 which is sealingly secured to a dished plate 72 to form a fluid chamber 73 therebetween. Plate 72 has a central connection with a conduit 74 leading to a source of liquid under pressure, such as a city water line or the like. Intermediate plate 68 and cross-member 61 are a plurality of compression springs 76, preferably six, continuously urging plate 68 downwardly. Upon supplying fluid to chamber 73 creating a pressure on diaphragm 71 sufficient to overcome the force of springs 76, plate 68 will be moved upwardly.

Spacing tubes 77 abut tubes 67 and the underside of a lower brake plate 78, and additional spacing tubes 79 abut the upper surface of plate 78 and the lower surface of a top brake plate 81.

Figures 3, 4:
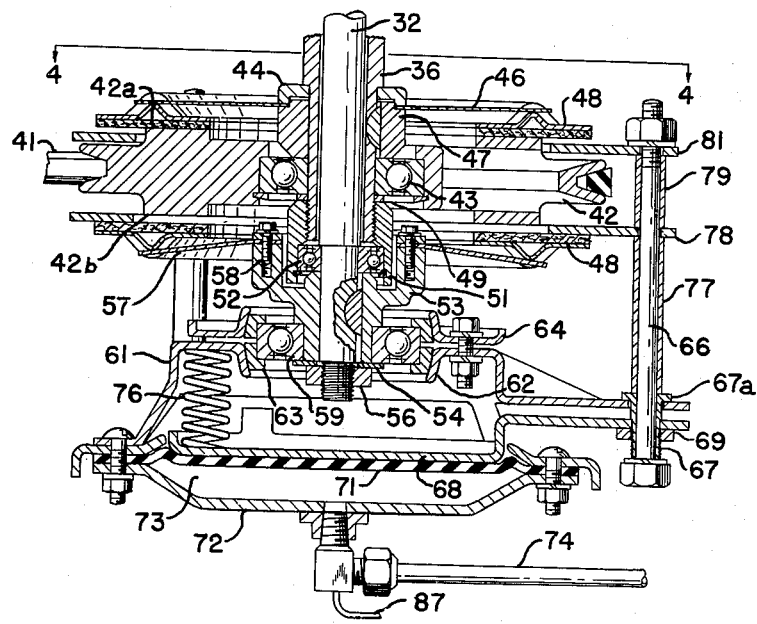
Figure 3 is an enlarged, sectional view showing the clutch-brake construction and fluid pressure motor illustrated in Fig. 1.
Figure 4 is a transverse, horizontal sectional view taken along the line 4—4 of Fig. 3.

Driven pulley 42 has a top annular surface 42a adapted to engage the top clutch element 48 and has a corresponding lower surface 42b adapted to engage the brake material of the lower clutch element 48. With the brake plates 78 and 81 shown in the position of Figs. 1 and 3, the top brake plate 81 has been moved downwardly out of contact with the clutch lining material of the top clutch member 48, permitting the spring arms of member 46 to force the said material into contact with surface 42a of pulley 42 thereby coupling pulley 42 with tubular shaft 36. At the same time, lower brake plate 78 has engaged the clutch lining material of lower clutch element 48 forcing this material out of contact with surface 42b of the pulley against the upward thrust of the spring arms of member 57 and into braking contact with the plate 78. Therefore, under these conditions, tubular shaft 36 will be rotated by pulley 42 and inner shaft 32 will be held against rotation. This condition will occur when the fluid pressure in chamber 73 is reduced to a point where springs 76 will overcome the fluid pressure and force plate 68 downwardly until the flanges 67a of tubes 67 engage the cross-member 61. When fluid under a predetermined minimum pressure is admitted to chamber 73, the reverse action occurs and plate 68 is forced upwardly against the resistance of springs 76 until it is stopped by contact with cross-member 61. This movement elevates brake plates 81 and 78 whereby the top brake plate 81 will engage the top clutch element 48, forcing this element out of contact with top surface 42a of pulley 42 and against the resistance of the spring arms of the top member 46. At the same time, lower brake plate 78 will move out of contact with the lower clutch element 48, permitting the spring arms of the member 57 to force lower element 48 into contact with lower surface 42b of pulley 42. Under these conditions, tubular shaft 36 will be held against rotation and inner shaft 32 will be rotated by pulley 42. It will now be understood that by intermittently supplying fluid to and exhausting fluid from chamber 73 that shafts 32 and 36 may be intermittently driven and that one shaft will be braked while the other is being driven.

The drive mechanism so far described is particularly adaptable to a washing machine provided with means compensating for out-of-balance loads during spinning of the container or a machine which does not require bolt-down means to prevent excessive vibration or walking of the machine. In a washing machine of the type illustrated in Fig. 1, after articles to be washed are disposed in container 28, water will be supplied from a conventional mixing valve through a conduit 82, and after a predetermined amount of wash water is supplied, the container will have a wobbling action imparted thereto by rotating tubular shaft 36, the housing 34 and the outer race of bearing 33, while holding shaft 32, stub shaft 31 and the container 28 against rotation. This will be effected as previously explained by supplying liquid under pressure to the fluid pressure motor or chamber 73. A conventional solenoid operable valve controls liquid flow through conduit 74 leading to chamber 73 and the opening and closing of this valve is controlled by a conventional electric timer or sequential controller mounted in a housing 84, the manually operable control rod for the timer being indicated at 86. After a predetermined washing interval, the valve supplying liquid under pressure to chamber 73 will be closed and the pressure in this chamber will be reduced by flow of liquid through a continuously open and relatively small bleed conduit 87 which is preferably connected to the drain conduit indicated at 88. As previously explained, reduction of liquid pressure in chamber 73 will permit plate 68 to be forced downwardly under the influence of springs 76 to disengage tubular shaft 36 from pulley 42 and brake this shaft and concurrently shaft 32 will be drivingly engaged with pulley 42. This will cause container 28 to rotate about a fixed axis, slightly inclined to the vertical, to extract liquid from the articles in the container by centrifugal force, and the liquid will pass through ports in the container indicated at 89 to be discharged into tub 19 and then through drain conduit 88. This cycle will be repeated one or more times to rinse the clothes, and after the final spin-rinse, the basket is preferably wobbled without rinse water being supplied to fluff the clothes prior to removal of the same from the container.

It will be noted that the parts of the clutch and brake mechanism described can be formed largely from stampings or parts which do not require precise machining. For example, clutch element 48 may be formed of stamped sheet metal. This element is of ring form, reinforced by pressing the central portion of the ring upwardly to form a ridge generally triangular in cross-section, the ridge being reduced at spaced points to receive the spring arms of member 46. Member 46 may be a stamping fixed to hub portion 47 by seating radially inner portions of the member within recesses provided in the hub. Similarly, member 57, plate 64, cross-member 61, plate 68, and dished plate 72 may be stampings. The portions of the parts forming the clutch and brake mechanism which require precision machining are primarily surfaces which engage the shafts 32 and 36 or the bearings 43, 52 and 59. Of course, the pulley surfaces 42a and 42b are machined or ground. The bearings are of the self-sealed type which do not require lubrication after assembly in the machine.

Figure 2:
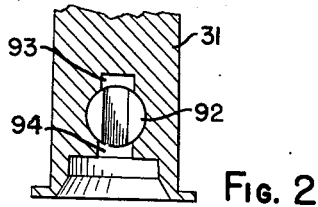
Figure 2 is an enlarged, fragmentary section of the stub shaft taken along line 2—2 of Fig. 1.

The manner in which the drive mechanism may be installed as a unit during assembly of the machine and in the event the unit requires repair may be removed as a unit and replaced by a similar unit will now be explained. All of the parts shown in Fig. 3 including the shafts 32 and 36 will be a sub-assembly unit. The conduits 74 and 87 will be subsequently connected to the unit. After the pedestal 21 is secured to frame 11, the frame is placed upside down on a conveyor and the unit is inserted and secured to the frame by bolting the arms of cross-member 61 to pads 91 secured to the frame. Shaft 32 has a flat upper portion 32a which is slidingly received within an elongate slot formed in a split pin 92 mounted in the lower end of stub shaft 31. The pin is split or formed in two parts for ease in machining the slot portions and each part of the pin includes a rounded head which abuts the inner race of bearing 33. As illustrated in Fig. 2, the stub shaft has a transverse generally circular bore therein forming a bearing for the heads of pin 92, the bore including an upper recess 93 and a lower slot 94 both somewhat greater in width than the slot in pin 92 to permit limited arcing movement of stub shaft 31 relative to shaft 32 in the plane of flat portion 32a. It will now be apparent that the stub shaft 31 has a universal connection with shaft 32, since pin 92 at the heads thereof has a pivotal engagement with bearing 33. After the unit is secured to the frame, the frame is turned right side up and the remaining parts are assembled, the rubber member 23 being fixed to pedestal 21 and the member 24 being telescoped over shaft 36. The housing 34, bearing 33 and stub shaft 31 is a unit sub-assembly and is secured by threading the housing to the upper end of shaft 36 with the flat portion 32a of shaft 32 being disposed in the rectangular slot formed in split pin 92.

In the event that any parts of the drive mechanism unit require repair or replacement, it is preferred that a new unit be substituted. This can be effected by disconnecting the conduits 74 and 87, placing the machine on its side or tilting the same sufficiently to withdraw the drive mechanism unit. This can be done merely by removing the bolts securing cross-member 61 to frame 11, removing belt 41 from the motor drive pulley, disconnecting housing 34 from the upper end of shaft 36, and withdrawing the unit. A new unit can be installed in a reverse manner. The fact that a unit can be quickly and easily replaced is of importance in that the machine is not held out of service while a particular part of the unit is being repaired. Also, the drive mechanism unit comprises parts which would normally be subjected to severe usage or would be most likely to require repair or replacement.

Figure 5:
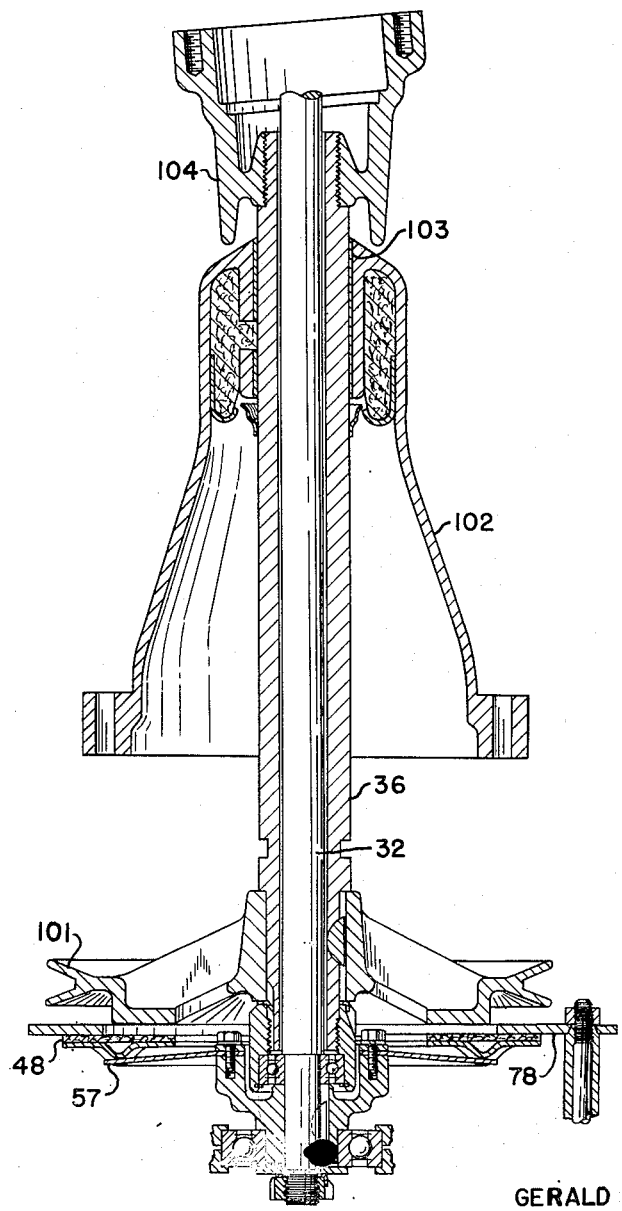
Figure 5 is a fragmentary, sectional view showing a modified type of drive mechanism.

Referring now to Fig. 5, we have shown a modified drive arrangement embodied in a washing machine similar to that illustrated in Fig. 1, except that in this instance no balancing means or means compensating for out-of-balance loads during spinning of the container are provided, and the machine is bolted to the supporting surface. With this construction we prefer that the outer or tubular shaft be continuously driven during operation of the machine and the inner shaft be intermittently driven or alternately rotated and braked against rotation.

In this embodiment, the driven pulley 101 is fixed to tubular shaft 36 by a key or the like whereby shaft 36 may be continuously driven during operation of the machine. The upper clutch and brake member 48 and associated parts and the upper brake plate are omitted. This means that the bolts 66 will be shortened and the upper spacing tube 79 will be omitted. The remaining parts of the clutch and brake mechanism or the parts beneath the pulley 101 are the same as shown in Fig. 1. The pedestal 102 is altered somewhat in form relative to pedestal 21 of Fig. 1 and is rigidly secured to the frame top plate 12. The top portion of pedestal 102 has a re-entrant tubular portion within which is telescoped a bearing sleeve 103 to form a top bearing for tubular shaft 36. The housing 34 shown in Fig. 1 is provided with an eccentric weight portion 35 to assist in counterbalancing the forces created by the wobbling motion of the basket during the washing period and this weight has been omitted from the housing 104, but otherwise the connections above the housing are the same as illustrated in Fig. 1. It is understood that since the balance means are omitted that the valve means, such as tubular member 23, the cooperating valve member 24, the liquid supply conduit 26 leading to the balancing valve, the balancing pockets 27 on the container 28, and certain other parts relating to the balancing arrangement, are omitted. Instead of the studs 13, lag shields or the like will be disposed in the concrete or the like supporting surface adapted to firmly engage a bolt having a threaded portion projecting above the supporting surface. The threaded portion of the bolts will project through the base of the frame legs 11 and be rigidly secured thereto by lock nuts. Spacing means such as washers may be employed for leveling the machine on the supporting surface.

The operation of a washing machine embodying the drive mechanism illustrated in Fig. 5 will now be described. After the articles to be washed are disposed in the container, a predetermined quantity of wash water will be supplied and upon start-up of the motor, tubular shaft 36 will be continuously rotated, since it is fixed to driven pulley 101. The automatic timer will hold the valve supplying liquid under pressure to chamber 73 closed whereby springs 76 will hold plate 68 in its lowermost position so that brake plate 78 will engage the clutch element 48 against the tendency of the spring arms of member 57 to lift the clutch element. Since member 57 is fixed to inner shaft 32 which is connected to the clothes container, the clothes container will be held against rotation and a wobbling action will be imparted to the container due to rotation of housing 104. After a predetermined washing period, as determined by the setting of the timer, the valve controlling flow of liquid through conduit 74 will be opened, thereby raising plate 68 by liquid pressure permitting clutch element 48 to engage pulley 101, brake plate 78 will continue to be moved upwardly and out of contact with clutch element 48 until upward movement of plate 68 is stopped by contact with cross member 61. As previously explained, the elevation of brake plate 78 is limited by engagement of plate 68 with the cross-member 61. Under these conditions both shafts 36 and 32 will be concurrently rotated at the same speed to spin the container and extract liquid from articles contained therein by centrifugal force.

Figure 6:
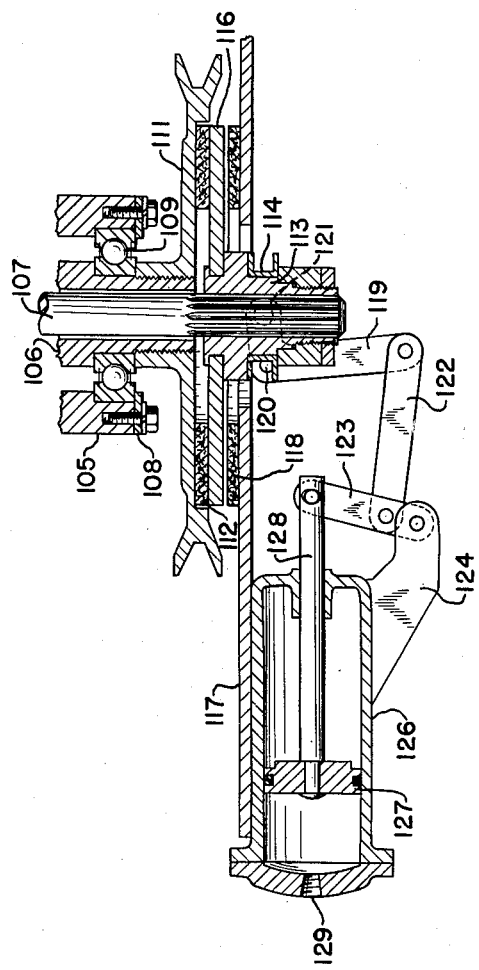
Figure 6 is a view generally similar to Fig. 5 showing a further modification of the drive mechanism.

Referring now to Fig. 6, we have shown a clutch and brake arrangement generally similar to that illustrated in Fig. 5 wherein an outer tubular shaft 106 is adapted to be continuously driven during operation of the washing machine and an inner shaft 107 is adapted to be alternately driven and braked. A tubular support 105 is fixed in any suitable manner to the frame portion of the machine and through a ring 108 bolted thereto locks the outer race of a bearing 109, the inner race of the bearing being locked to shaft 106 by threading the hub of a pulley 111 to shaft 106. The tubular shaft 106 is supported at its upper portion by a bearing mounted in a pedestal fixed to the machine frame as described in connection with Fig. 5. The shaft 107 is connected to the container through a stub shaft, universal joint, bearing, and housing, as described in connection with Fig. 1.

The lower surface of pulley 111 has a ring of clutch lining material or the like 112 bonded or otherwise secured thereto. The lower portion of shaft 107 is provided with axially extending splines which engage grooves provided in the bore of an axially movable sleeve 113, the sleeve having a peripheral groove 114 provided therein. An annular plate 116 is fixed to the upper portion of sleeve 113. A fixed plate 117 has a ring of brake lining material 118 secured thereto which is adapted to be frictionally engaged by plate 116. This plate is supported from the machine frame in a manner similar to the cross-member 61 described in connection with Fig. 2.

An L-shaped arm 119 has a yoke form top portion provided with pins 121 extending transversely from the end of the yoke arms to engage the groove 114 of sleeve 113 whereby the sleeve 113 and its associated parts may be moved axially by rocking movement of lever 119 which is pivotally movable about an axis indicated at 120. The lower end of lever 119 is pin-connected to a link 122, the opposite end of the link being pin-connected to a lever 123 pivotally mounted by an arm 124 formed on a cylinder 126 secured to plate 117 or otherwise suitably mounted. A piston 127 slidable in cylinder 126 has its stem 128 pin-connected to the upper end of lever 123. The cylinder 126 has a liquid entry port as indicated at 129 adapted to be connected to a source of liquid under pressure such as the conduit 74 illustrated in Fig. 1 whereby when liquid pressure is applied to the piston under control of a valve operated by the timer, the piston will be caused to move toward the right (as viewed in Fig. 6) and through the linkage described move sleeve 113 upwardly to engage material 112 and couple shaft 107 to pulley 111. When this is effected, both shafts 106 and 107 will be concurrently driven at the same speed to spin the clothes container and extract liquid from the clothes by centrifugal force as previously described. When the valve controlling the supply of fluid under pressure to cylinder 126 is closed, the fluid will be permitted to drain from the cylinder as by a bleed conduit associated with the liquid supply conduit for the cylinder whereby the piston may move to the left (as viewed in Fig. 6). The plate 116 will then move downwardly to engage material 118 and brake shaft 107. Any suitable means, such as springs, may be used to insure sufficient frictional contact between plate 116 and material 118 to cause shaft 107 to cease rotating in a desired time interval.

It will now be understood that we have provided a washing machine of the spin-drier type having a drive mechanism comprising parts which can be largely formed of stampings or which require a minimum of precision machining, which can be a unit sub-assembly, which is relatively quiet in operation, and which can be easily and quickly assembled in the machine as a unit and easily replaced by a similar unit.

We wish it to be understood that we do not desire to be limited to the exact details of construction shown and described, for obvious modifications will occur to a person skilled in the art.

What is claimed is:

1. In a washing machine of the spin-drier type, a supporting frame, a drive mechanism comprising a pair of coaxial shafts rotatable in the same direction, a driven pulley mounted coaxially of the shafts and freely rotatable relative thereto, a pair of clutch elements mounted coaxially of the shafts with each fixed to a different shaft and engageable with the pulley, non-rotatable brake means mounted on the frame, means for selectively engaging one clutch element wtih the pulley and the other clutch element with the brake means whereby either shaft may be rotated while the other shaft is braked against rotation, a clothes container, a stub shaft connected to the clothes container, a universal joint connecting the stub shaft to one of said coaxial shafts, and a bearing engaging the stub shaft and mounted in the other coaxial shaft with the bearing axis at a slight fixed angle to the axis of said other shaft whereby when the said one shaft is held against rotation and the said other shaft is rotated the stub shaft axis will be caused to travel in a conical path thereby imparting a wobbling action to the container.

2. In a washing machine of the spin-drier type having a supporting frame, a drive mechanism removable and replaceable as a unit in said machine, said mechanism comprising a cross-member adapted to be detachably secured to the frame, a clutch element rotatably supported by the cross-member, a first shaft fixed to the clutch element, a second tubular shaft rotatably mounted relative to the first shaft and coaxial therewith, a second clutch element fixed to the second shaft, a driven pulley rotatably mounted relative to the second shaft and disposed between the clutch elements, means for resiliently pressing each clutch element towards the pulley, an axially movable member including spaced brake plates, means for moving said member axially whereby in one position one brake plate will engage one clutch element and force it out of contact with the pulley while the other brake plate is moved out of contact with the other clutch element permitting said element to engage the pulley, and in another position the reverse action will occur whereby either shaft may be driven while the other shaft is braked against rotation.

3. The washing machine as described in claim 2 and wherein the first shaft is adapted to drivingly engage a universal joint by axial movement of the shaft, the tubular shaft being adapted to have a housing for the universal joint detachably secured thereto, and all of said mechanism being insertable in and removable from the machine as a unit by engaging or disengaging the cross-member from the frame.

4. A drive mechanism for washing machines of the spin-drier type adapted to be insertable in and removable from the machine as a unit, said mechanism comprising a cross-member adapted to be detachably secured to the machine frame, a first shaft, bearing means between said shaft and cross-member whereby the shaft is rotatably supported and held against endwise movement relative to the cross-member, a second tubular shaft coaxial of the first shaft, bearing means between said shafts whereby the second shaft is rotatably supported and held against endwise movement relative to the first shaft, a driven pulley coaxial of the shafts and freely rotatable relative thereto, clutch means fixed to each shaft resiliently pressed towards the pulley, axially movable brake means adapted to concurrently contact the clutch means of one shaft and force the same out of engagement with the pulley and move out of contact with the other clutch means permitting the same to engage the pulley, and means supported by the cross-member for moving the brake means.

5. The drive mechanism as defined in claim 4 and wherein the end of the first shaft remote from the cross-member is adapted to be drivingly connected to a universal joint, and the end of the second shaft remote from the cross-member is adapted to have a bearing housing detachably secured thereto.

6. In a washing machine of the spin-drier type, a supporting frame, a drive mechanism comprising a pair of coaxial shafts rotatable in the same direction, a driven pulley having a flat contact surface normal to the shaft axes, a clutch element mounted coaxially of the shafts and secured to one of said shafts, said clutch element being of annular form and having clutch facing material secured to a surface thereof adjacent the pulley contact surface, a member secured to said one shaft having a plurality of resilient radial arms drivingly engaging the clutch element and continuously urging the clutch element towards the pulley, a non-rotatable but axially movable member mounted on said frame having a braking surface adapted to engage the facing material of the clutch element, means for driving the other shaft through the pulley, means for moving the non-rotatable member in opposite axial directions whereby as said member is moved in one axial direction a predetermined amount it will permit the clutch element to engage the pulley under the influence of the resilient arms and thereafter the non-rotatable member will move out of contact with the clutch element to drivingly couple said one shaft with the pulley, and when the non-rotatable member is moved in the opposite axial direction a predetermined amount it will re-engage the clutch element to overcome the influence of the resilient arms and move the clutch element out of contact with the pulley whereby said one shaft will be braked against rotation.

7. The washing machine as described in claim 6 and wherein a fluid pressure motor is operably connected to the non-rotatable member for moving the same axially.

8. In a washing machine of the spin-drier type, a supporting frame, a drive mechanism comprising a pair of coaxial shafts rotatable in the same direction, a driven pulley mounted coaxially of the shafts and freely rotatable relative thereto, the pulley having a flat contact surface normal to the shaft axes on each face thereof, a pair of clutch elements mounted coaxially of the shafts and at opposite sides of the pulley, each clutch element being fixed to a different shaft and having brake lining secured to a surface thereof adjacent the pulley, a pair of members each secured to a different shaft and each having resilient radial arms drivingly engaging one of said clutch elements and continuously urging its associated clutch element towards the pulley, a pair of axially spaced and non-rotatable brake members mounted on the said frame and each being adapted to engage a different clutch element, means movable in opposite axial directions and connected to the brake members whereby both brake members may be concurrently moved in a given axial direction, movement of the brake members a predetermined amount in one axial direction permitting one clutch element to engage the pulley under the influence of its associated resilient arms while the other brake member is lifting the other clutch element out of contact with the pulley and against the resistance of its associated resilient arms, and movement of a brake member in a direction to permit engagement of its associated clutch element with the pulley being sufficient to move the said brake element out of contact with said clutch element whereby movement of the brake members in either axial direction will couple one shaft with the pulley and concurrently brake the other shaft against rotation.

GERALD I. COCKERILL.
WILLIAM F. SINDELAR.

References Cited in the file of this patent

UNITED STATES PATENTS

| Number | Name | Date |
|---|---|---|
| 1,757,773 | Klein | May 6, 1930 |
| 2,291,088 | Morgenstern | July 28, 1942 |

FOREIGN PATENTS

| Number | Country | Date |
|---|---|---|
| 600,497 | Great Britain | Apr. 9, 1948 |